(12) United States Patent
Urata et al.

(10) Patent No.: US 8,770,605 B2
(45) Date of Patent: Jul. 8, 2014

(54) CHASSIS FRAME

(75) Inventors: Manabu Urata, Minato-ku (JP);
Kenichi Suzuki, Minato-ku (JP); Junji Ishii, Kasaoka (JP); Yoshitaka Noda, Kasaoka (JP); Mitsuyori Gurita, Kasaoka (JP)

(73) Assignees: Mitsubishi Jidosha Kogyo Kabushiki Kaisya, Tokyo (JP); Hiruta-Kogyo Co., Ltd., Okayama (JP)

( * ) Notice: Subject to any disclaimer, the term of this patent is extended or adjusted under 35 U.S.C. 154(b) by 0 days.

(21) Appl. No.: 14/113,643

(22) PCT Filed: Apr. 27, 2012

(86) PCT No.: PCT/JP2012/061375
§ 371 (c)(1),
(2), (4) Date: Oct. 24, 2013

(87) PCT Pub. No.: WO2012/147921
PCT Pub. Date: Nov. 1, 2012

(65) Prior Publication Data
US 2014/0049032 A1 Feb. 20, 2014

(30) Foreign Application Priority Data

Apr. 27, 2011 (JP) ................................. 2011-099366

(51) Int. Cl.
*B62D 21/02* (2006.01)
*B60G 21/055* (2006.01)

(52) U.S. Cl.
CPC ............ *B60G 21/0551* (2013.01); *B62D 21/02* (2013.01)
USPC ........ 280/124.13; 280/124.107; 280/124.149; 180/311; 296/203.02; 296/205

(58) Field of Classification Search
CPC .... B21D 22/027; B21D 39/00; B21D 39/026; B21D 41/045; B21D 41/04; B62D 21/10; B62D 27/00; B62D 27/02; B60G 21/05; B60G 21/055; B60G 21/0551; B60G 2202/135
USPC ...................... 280/124.107, 124.13, 124.137, 280/124.149, 124.152, 785, 795, 796, 798; 180/311, 312; 296/203.02, 205
See application file for complete search history.

(56) References Cited

U.S. PATENT DOCUMENTS

| | | | | |
|---|---|---|---|---|
| 4,138,141 | A * | 2/1979 | Andersen | ....................... 267/273 |
| 4,623,167 | A * | 11/1986 | Matsubayashi et al. | ...... 280/798 |
| 2011/0175315 | A1* | 7/2011 | Narishima et al. | ..... 280/124.107 |

(Continued)

FOREIGN PATENT DOCUMENTS

| | | |
|---|---|---|
| JP | S63-194049 | 8/1988 |
| JP | H3-61826 | 6/1991 |

(Continued)

*Primary Examiner* — Ruth Ilan
*Assistant Examiner* — Darlene P Condra
(74) *Attorney, Agent, or Firm* — DLA Piper LLP (US)

(57) ABSTRACT

A chassis frame (1) including connection members (13) each configured by a pipe that is connected to a vehicle body frame. Each connection member (13) is provided with an attachment part (2) at an end of the pipe. The attachment part (2) includes a flat attachment face (21) formed by flatly crashing an end of the pipe to form the overlapped portion where a plate of the pipe is overlapped. The flat attachment face (21) is provided on a center in left and right direction of the overlapped portion. A shape of the end of the pipe is a substantially gate shape in its cross section. The attachment part (2) further includes longitudinal ribs (22) bending from the flat attachment face (21) to both left and right sides of the overlapped portion. Each longitudinal rib (22) is formed with a through hole (221) communicating an outside and an inner side of each connection member (13) by expanding a folded edge of the overlapped portion, the through hole is shortened by cutting the plate of the pipe surrounding an opening of the through hole (221).

2 Claims, 9 Drawing Sheets

(56) References Cited

U.S. PATENT DOCUMENTS

2012/0018973 A1* 1/2012 Fujii et al. .............. 280/124.134
2012/0160589 A1* 6/2012 Tsumiyama et al. ......... 180/291
2013/0285343 A1* 10/2013 Werner et al. .......... 280/124.116

FOREIGN PATENT DOCUMENTS

| JP | H10-324269 | 12/1998 |
| JP | 2004-34815 A | 2/2004 |
| JP | 2008-143313 A | 6/2008 |

* cited by examiner

CHASSIS FRAME

TECHNICAL FIELD

The present invention relates to a chassis frame including connection members each configured by a pipe made of metal that is connected to a vehicle body frame.

BACKGROUND ART

It is required that a chassis frame has a high strength and stiffness. At the same time the chassis frame is required to be as light as possible. It is configured by assembling cross members and side members to have a shape of an octothorpe as disclosed in Patent Document 1. It is also configured by joining an upper member and a lower member to have a hollow cross section. The upper member and the lower member are made by a press working on a metal plate. The chassis frame is connected to a vehicle frame by bolting connection members. Each connection member is a mounting arm made of a metal pipe that is separately provided on the cross members, the side members, the upper member or the lower member.

A chassis frame disclosed in Patent Document 1 includes a flat attachment face formed by flatly crashing an end of the side member to an approximately gate shape in its cross section. The flat attachment face is on an overlapped portion where plate of the pipe (periphery of the pipe) is overlapped. The connection member further includes longitudinal ribs bending from the flat attachment face to both sides of the overlapped portion (Patent Document 1, [0006] [0008]). The flat attachment face is provided with a hole for bolting on its center. The flat attachment face is abutted to a corresponding mounted portion of a vehicle frame to bolt each other. The longitudinal ribs enhance a stiffness of an end portion of the side member and prevent it from interfering with other members by adjusting width of the flat attachment face (Patent Document 1, [0009]).

PRIOR ARTS

Patent Document

Patent Document 1: Japanese Patent Application Publication No. H10-324269A

DISCLOSURE OF THE INVENTION

Problem to be Solved by the Invention

Figure 2:
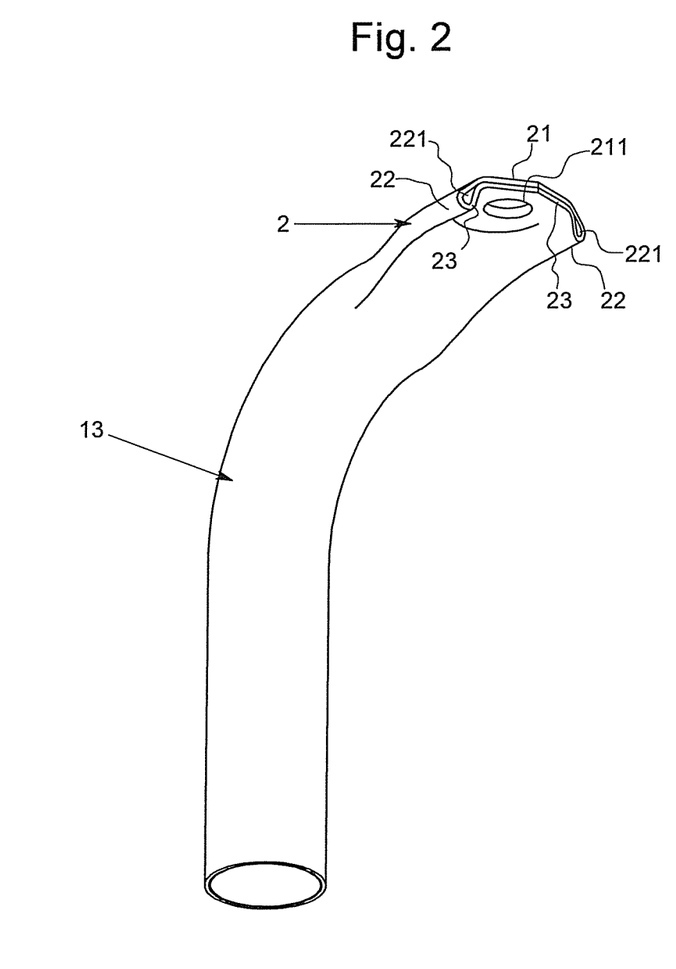
FIG. 2 A perspective view illustrating a connection member of the present example, seen below.

In the chassis frame of Patent Document 1, each longitudinal rib is formed with a through hole communicating an outside and an inner side of each connection member by expanding a folded edge of the overlapped portion (see Patent Document 1, FIG. 2). The through hole could be used as a hole for draining a rust preventing paint which flows into the chassis frame. Because it is necessary to keep away from the head of bolt penetrating the flat attachment face, a cross sectional shape of the hole for draining cannot be made large, while the hole for draining tends to be long. This is problematic in that the rust preventing paint is not rapidly drained. It is studied to effectively utilize the through hole as the hole for draining the rust preventing paint by enhancing a draining rate, not by enlarging the cross sectional shape.

Means to Solve the Problems

Provided is a chassis frame comprising connection members each configured by a pipe that is connected to a vehicle body frame. Each connection member is provided with an attachment part at an end of the pipe. The attachment part includes a flat attachment face formed by flatly crashing the end of the pipe to form the overlapped portion where a plate of the pipe is overlapped. The flat attachment face is provided on a center in left and right direction of the overlapped portion. A shape of the end of the pipe is a substantially gate shape in its cross section. The attachment part further includes longitudinal ribs bending from the flat attachment face to both left and right sides of the overlapped portion. Each longitudinal rib is formed with a through hole communicating an outside and an inner side of each connection member by expanding a folded edge of the overlapped portion. The through hole is shortened by cutting the plate of the pipe surrounding an opening of the through hole.

The connection members are different depending on chassis flames. As mentioned above, the connection members are double as cross members or side members in case the chassis frame is assembled to have a shape of an octothorpe with the cross members or the side members made of metal pipes. Each connection member is a mounting arm made of metal pipe that is separately provided on an upper member or a lower member in case the chassis frame is configured by joining the upper member and the lower member which are made by a press working on a metal plate. "Through hole is shortened" means that a substantial length of the through hole having same cross section in extending direction is shorter than that of the through hole in which the plate of the pipe surrounding the opening is not cut. In case the plate of the pipe is cut, the length of the through hole differs depending on a portion of the opening since a shape of cut end face makes the opening of the through hole stereoscopic. In this case, a longest portion must be shorter than the through hole before cutting.

The thorough hole of each longitudinal rib, which is utilized as the hole for draining the rust preventing paint, is shortened by cutting the plate of the pipe surrounding the opening of the through hole. If the plate of the pipe is cut in any way, the through hole is shortened to some extent. However, if it is cut too much, it unnecessary makes the flat attachment face narrow and disturbs a function of the flat attachment face, especially bolting. Therefore, it is preferable that the pipe surrounding the opening of the through hole of each longitudinal rib is cut outside a virtual circle. The virtual circle is concentric with a hole for bolting provided on the flat attachment face. The virtual circle is a same size as or larger than a head of a bolt inserted into the hole for bolting. According to this, the flat attachment face becomes large enough to securely support the bolt even though the plate of the pipe is cut.

Effects of the Invention

According to the chassis frame of the present invention, the paint (rust preventing paint) which flows into the inside of the chassis frame is rapidly drained by configuring the through hole of each longitudinal rib for a reinforcement, which is provided on an end portion of the connection member connected to the vehicle body frame, as short as possible. This means that a resistance of air flowing in an out becomes small. This enables air smoothly flows in and out when the rust preventing paint flows into an inside of the chassis frame. The present invention contributes to enhancing a production efficiency by shortening a time required to paint the inside of the chassis frame to totally shorten a manufacturing time.

EMBODIMENTS FOR CARRYING OUT THE INVENTION

Figure 1:
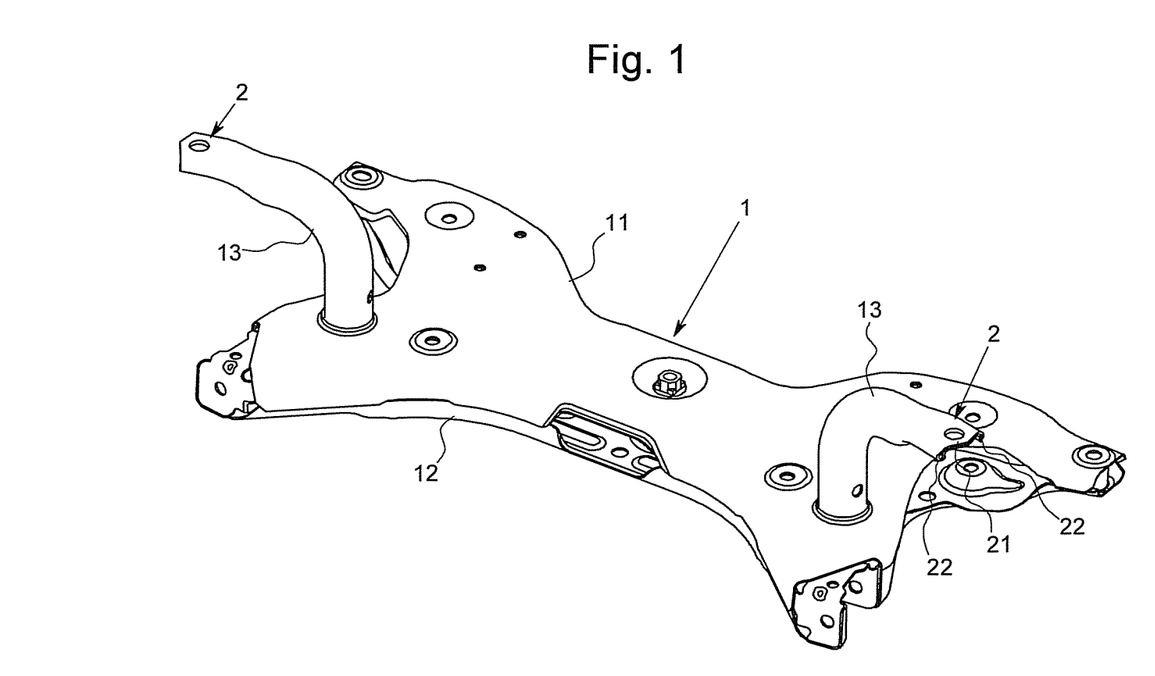
FIG. 1 A perspective view illustrating one example of a chassis frame of the present invention.

Embodiments for carrying out the invention is explained with reference to Figures. The present invention is applied with mounting arms 13 (a connection member) made of metal pipes. The mounting arms 13 are separately provided on an upper member 11 of a chassis frame 1. As illustrated in FIG. 1, the chassis frame 1 is configured by joining the upper member 11 and a lower member 12, which are made by press workings on metal plates. The mounting arms 13 are provided around a left edge and a right edge of the upper member 11, and form a pair. Each mounting arm 13 serves as a connection member made of metal, and has a shape protruding upward, then horizontally bending leftward or rightward, and provided with an attachment part 2 on an end portion.

As illustrated in FIGS. 2 to 5, each attachment part 2 includes a flat attachment face 21 formed by flatly crashing an end of the pipe to form the overlapped portion where a plate of the pipe is overlapped. The flat attachment face 21 is provided on a center in left and right direction of the overlapped portion. A shape of the end of the pipe is a substantially gate shape in its cross section. The connection member further includes longitudinal ribs 22,22 bending from the flat attachment face 21 to both left and right sides of the overlapped portion. Each longitudinal rib 22 expands a folded edge of the overlapped portion and has a teardrop shape in a front view. Since the plate of the pipe is not in contact, a through hole 221 communicating an inside and an outside of the connection member. The through hole 221 is a teardrop shape copying an outer shape of the longitudinal rib 22, though it is slightly horizontally long since the plate of the pipe surrounding the through hole 221 is cut.

Figure 3:
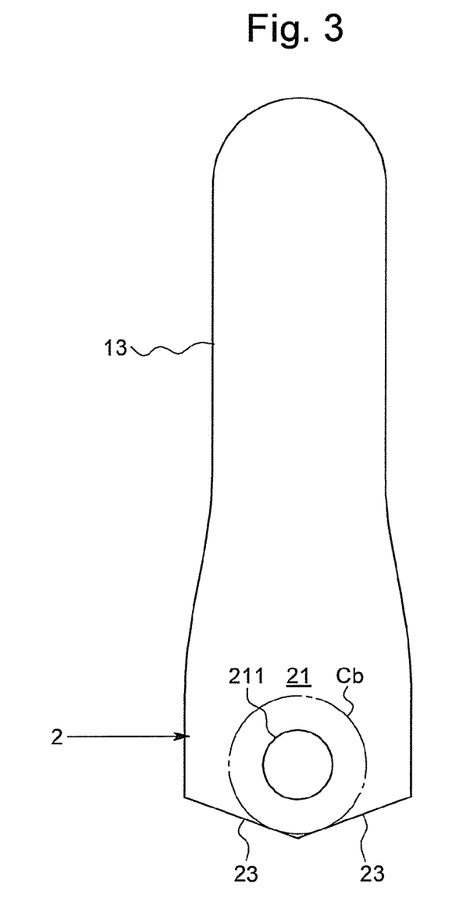
FIG. 3 A plain view illustrating the connection member of the present example.
Figure 4:
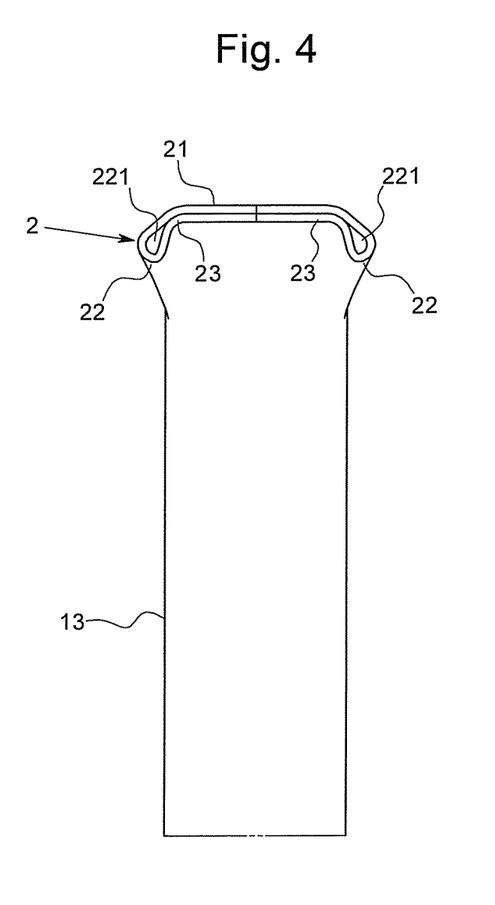
FIG. 4 A front view illustrating the connection member of the present example.
Figure 5:
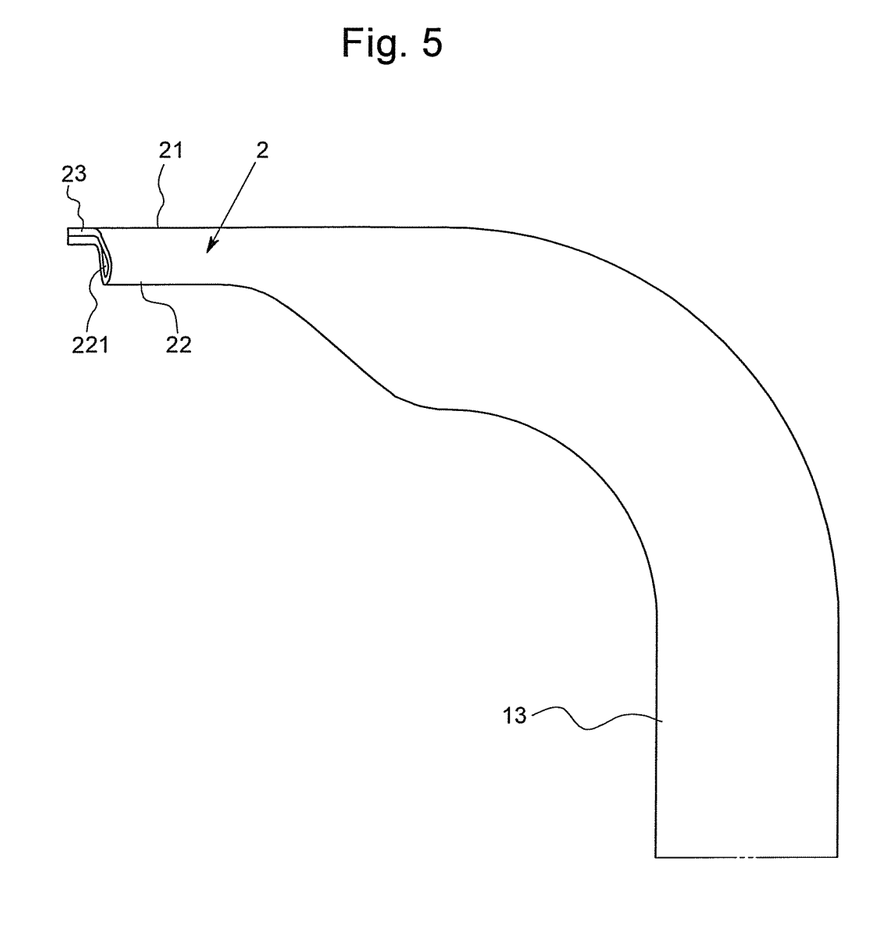
FIG. 5 A side view illustrating the connection member of the present example.
Figure 6:
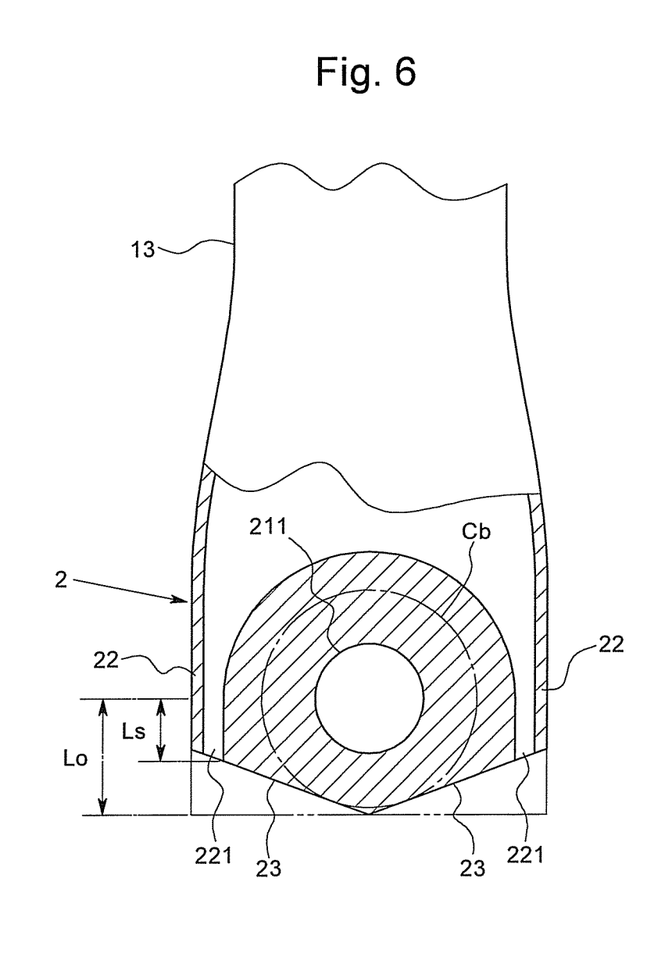
FIG. 6 A plain view illustrating the connection member of the present example, the connection member partially cut.

As illustrated in FIG. 3, the plate of the pipe surrounding the through holes 221 bilaterally symmetrically cut along tangent lines with respect to a virtual circle Cb which is same size as or larger than a head of a bolt and is concentric with a hole 211 for bolting provided on the flat attachment face 21 to form a pair of inclined end faces 23,23 in this example. This makes the through holes 221 of the longitudinal ribs 22 shorter without making the overlapped portion (a hatched region surrounding the hole 211 for bolting in FIG. 6) smaller. The bolt is inserted into the hole 211 for bolting and the head of the bolt faces the overlapped portion. In the present example, the plate of the pipe is bilaterally symmetrically cut along tangent lines with respect to the virtual circle Cb. The tangent lines incline at approximately 20 degrees from an end face before being cut. A length Ls of the shortened left and right through holes is about half of a length Lo of the original through hole.

Figure 7:
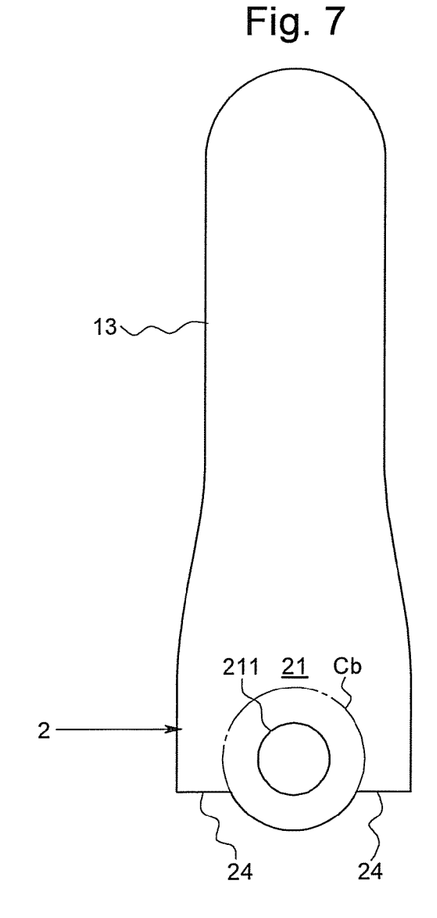
FIG. 7 A plain view illustrating the connection member of the first another example, this figure corresponding to the FIG. 3.

The present invention is configured as follows too. A first another example is illustrated in FIG. 7. The plate of the pipe surrounding the through holes 221 is bilaterally symmetrically cut along the circle of the virtual circle Cb and lines crossing the virtual circle Cb to form a pair of left and right cut end faces 24,24. The virtual circle Cb is concentric with the hole 211 for bolting and is a same size as or larger than the head of the bolt inserted into the hole 211 for bolting. The cut end faces 24 are easy to make the length of the through holes 211 shorter compared to the inclined end faces 23.

Figure 8:
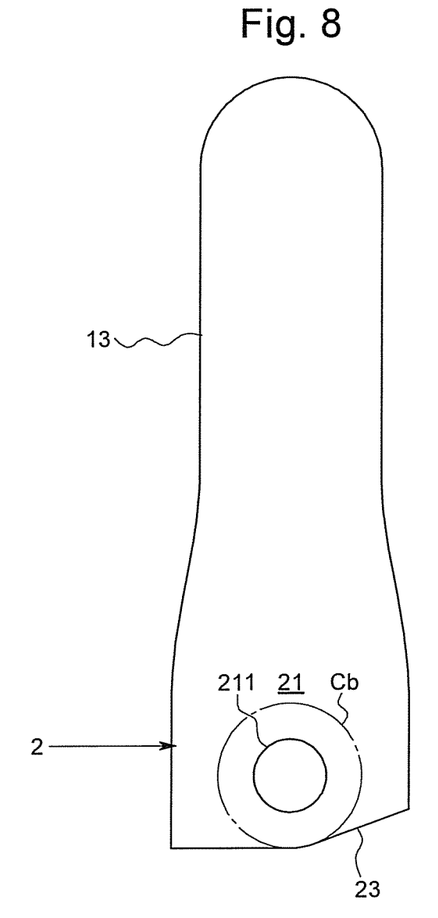
FIG. 8 A plain view illustrating the connection member of the second another example, this figure corresponding to the FIG. 3.

Although the though holes 221 form a pair and exist on left side and right side sandwiching the flat attachment face 21, the present inventions is applicable to either the through hole 221 on the left side or that on the right side. As illustrated in FIG. 8, the plate of the pipe surrounding the through hole 221 on the right side is only cut along a tangent line with respect to the virtual circle Cb to unsymmetrically form a inclined end face 23. The virtual circle Cb is concentric with the hole 211 for bolting and is a same size as or larger than the head of the bolt inserted into the hole 211 for bolting. The inclined end face 23 may be formed by unsymmetrically cutting the pipe surrounding the opening of the through hole 221 on the left side only.

Figure 9:
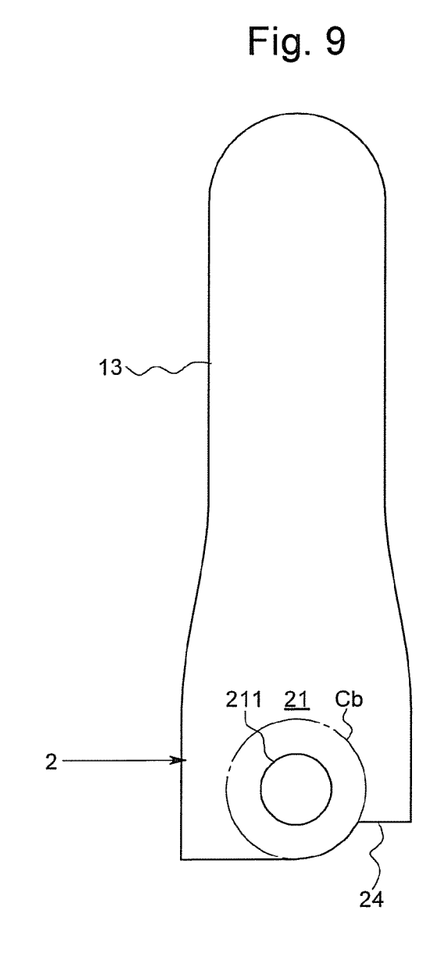
FIG. 9 A plain view illustrating the connection member of the third another example, this figure corresponding to the FIG. 3.

As illustrated in FIG. 9, the plate of the pipe surrounding the through hole 221 on the right side is only cut along a circle of the virtual circle Cb and a line crossing the virtual circle Cb to unsymmetrically form the cut end face 24. The virtual circle Cb is concentric with the hole 211 for bolting and is a same size as or larger than a head of the bolt inserted into the hole 211 for bolting. The inclined end face 24 may be formed by unsymmetrically cutting the pipe surrounding the opening of the through hole 221 on the left side only.

REFERENCE NUMERALS

1 Chassis frame
11 Upper member
12 Lower member
13 Mounting arm (connection member)
2 Attachment part
21 Attachment face
211 Hole for bolting
22 Longitudinal rib
221 Through hole
23 Inclined end face
24 Cut end face
Lo Length of the original through hole
Ls Length of the shortened through hole
Cb Virtual circle concentric with the hole for bolting

The invention claimed is:

1. A chassis frame comprising connection members each configured by a pipe that is connected to a vehicle body frame, wherein
each connection member is provided with an attachment part at an end of the pipe, the attachment part includes a flat attachment face formed by flatly crashing the end of the pipe to form an overlapped portion where a plate of the pipe is overlapped, the flat attachment face is provided on a center in left and right directions of the overlapped portion, the attachment part further includes longitudinal ribs bending from the flat attachment face to both left and right sides of the overlapped portion, and
each longitudinal rib is formed with a through hole communicating an outside and an inner side of each connection member by expanding a folded edge of the overlapped portion, a length of the through hole is shortened relative to an adjacent end of the pipe by cutting a plate of the pipe surrounding an opening of the through hole.

2. The chassis frame according to claim 1, wherein the plate of the pipe surrounding the opening of the through hole of each longitudinal rib is cut outside a virtual circle, the virtual circle is concentric with a hole for bolting provided on the flat attachment face, the virtual circle is a same size as or larger than a head of a bolt inserted into the hole for bolting.

* * * * *